(12) United States Patent
Hwangbo et al.

(10) Patent No.: US 11,982,805 B2
(45) Date of Patent: May 14, 2024

(54) WIDE-ANGLE, HIGH-RESOLUTION DISTANCE MEASUREMENT DEVICE

(71) Applicant: SAMSUNG ELECTRONICS CO., LTD., Suwon-si (KR)

(72) Inventors: Minsu Hwangbo, Suwon-si (KR); Myungsik Kim, Suwon-si (KR); Hyunseok Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 17/599,888

(22) PCT Filed: Mar. 26, 2020

(86) PCT No.: PCT/KR2020/004099
§ 371 (c)(1),
(2) Date: Sep. 29, 2021

(87) PCT Pub. No.: WO2020/204458
PCT Pub. Date: Oct. 8, 2020

(65) Prior Publication Data
US 2022/0163794 A1 May 26, 2022

(30) Foreign Application Priority Data
Mar. 29, 2019 (KR) .................. 10-2019-0037294

(51) Int. Cl.
G02B 27/00 (2006.01)
G01S 17/48 (2006.01)
(Continued)

(52) U.S. Cl.
CPC .......... G02B 27/0025 (2013.01); G01S 17/48 (2013.01); G01S 17/931 (2020.01);
(Continued)

(58) Field of Classification Search
CPC ... G02B 27/0025; G01S 17/48; G01S 17/931; G01S 7/4816; G01S 17/46; G01S 17/89;
(Continued)

(56) References Cited

U.S. PATENT DOCUMENTS 7,176,960 B1 * 2/2007 Nayar .................. G06T 3/4038
348/207.99
8,175,337 B2 5/2012 Park et al.
(Continued)

FOREIGN PATENT DOCUMENTS

CN 105974427 A 9/2016
CN 108474936 A 8/2018
(Continued)

OTHER PUBLICATIONS

International Search Report (PCT/ISA/210) dated Jul. 10, 2020 issued by the International Searching Authority in International Application No. PCT/KR2020/004099.
(Continued)

Primary Examiner — Nasim N Nirjhar
(74) Attorney, Agent, or Firm — Sughrue Mion, PLLC

(57) ABSTRACT

A wide-angle, high-resolution distance measurement device according to one aspect of the present disclosure comprises: a light source which emits structured light; a camera which forms an image by capturing reflected light, which is the structured light emitted from the light source and incident on the camera after being reflected by an obstacle; and a resolution correction lens which is disposed in front of the camera and corrects the reflected light which is reflected by the obstacle and incident on the camera, such that the resolution of the image formed by the camera is uniform irrespective of distance.

13 Claims, 19 Drawing Sheets

(51) Int. Cl.
  *G01S 17/931* (2020.01)
  *H04N 23/54* (2023.01)
  *H04N 23/55* (2023.01)
  *H04N 23/56* (2023.01)
(52) U.S. Cl.
  CPC ............ *H04N 23/54* (2023.01); *H04N 23/55* (2023.01); *H04N 23/56* (2023.01)
(58) Field of Classification Search
  CPC ........ G01S 17/93; H04N 23/54; H04N 23/55; H04N 23/56; H04N 23/80; H04N 23/698; H04N 23/74; H04N 5/2226
  See application file for complete search history.

(56) References Cited

U.S. PATENT DOCUMENTS

| | | | |
|---|---|---|---|
| 9,523,771 | B2 | 12/2016 | Romano et al. |
| 10,890,695 | B2 | 1/2021 | Piskunov et al. |
| 2015/0198716 | A1 | 7/2015 | Romano et al. |
| 2017/0139039 | A1 | 5/2017 | Horsch et al. |
| 2017/0224272 | A1* | 8/2017 | Liu ........................ A61B 5/4547 |
| 2017/0247745 | A1* | 8/2017 | Shultz ................ G01N 21/6428 |
| 2018/0203205 | A1* | 7/2018 | Cao ........................ G02B 17/002 |
| 2018/0308282 | A1 | 10/2018 | Yokoi |
| 2019/0025475 | A1 | 1/2019 | Piskunov et al. |
| 2019/0213710 | A1* | 7/2019 | Roulet ................... H04N 23/69 |
| 2020/0333131 | A1* | 10/2020 | Guo ................... G02B 19/0066 |

FOREIGN PATENT DOCUMENTS

| | | |
|---|---|---|
| DE | 10 2008 014 912 A1 | 9/2009 |
| JP | 07240840 A | 9/1995 |
| JP | 07280939 A | 10/1995 |
| JP | 2002006127 A | 1/2002 |
| JP | 2006018184 A | 1/2006 |
| JP | 2009-229458 A | 10/2009 |
| JP | 2009264965 A | 11/2009 |
| JP | 2012231911 A | 11/2012 |
| JP | 2015-143685 A | 8/2015 |
| JP | 2018139373 A | 9/2018 |
| JP | 2018179911 A | 11/2018 |
| JP | 6441231 B2 | 12/2018 |
| KR | 100791389 B1 | 1/2008 |
| KR | 10-2013-0095494 A | 8/2013 |
| KR | 10-1382476 B1 | 4/2014 |
| KR | 10-2014-0062600 A | 5/2014 |
| KR | 1020150092612 A | 8/2015 |
| KR | 101883180 B1 | 7/2018 |
| WO | 2014/100250 A2 | 6/2014 |

OTHER PUBLICATIONS

Written Opinion (PCT/ISA/237) dated Jul. 10, 2020 issued by the International Searching Authority in International Application No. PCT/KR2020/004099.
Communication dated Nov. 9, 2021, issued by the European Patent Office in European Application No. 20783192.6.
Communication dated Mar. 1, 2023, issued by the National Intellectual Property Office of PR China in Chinese Patent Application No. 202080014362.X.
Communication dated Jul. 19, 2023 issued by the European Patent Office in European Patent Application No. 20783192.6.
Communication dated Aug. 30, 2023 issued by the Korean Intellectual Property Office in Korean Application No. 10-2019-0037294.

* cited by examiner

WIDE-ANGLE, HIGH-RESOLUTION DISTANCE MEASUREMENT DEVICE

TECHNICAL FIELD

The disclosure relates to a distance measurement device using structured light, and more particularly, to a wide-angle high-resolution distance measurement device having a wide horizontal angle of view and a high far-field resolution.

BACKGROUND ART

Mobile robots such as cleaning robots, guide robots, and the like require the ability to autonomously plan a route, detect obstacles, and avoid collisions in order to move or perform tasks. To this end, the mobile robot needs to detect its own position, and needs the ability to measure the distance to an obstacle to detect its own position.

For measuring the distance to an obstacle, a distance measurement device using structured light and an image sensor is widely used.

An example of a distance measurement device according to the prior art is illustrated in FIGS. 1 to 3.

FIG. 1 is a perspective view illustrating a distance measurement device according to the prior art. FIG. 2 is a view illustrating an image captured by a camera of FIG. 1, and FIG. 3 is a side view illustrating the distance measurement device of FIG. 1.

As illustrated in FIG. 1, the distance measurement device 100 according to the prior art emits structured light 105 in the form of a line onto an obstacle 107 by using a light source 101 such as a laser, and obtains an image 110 of reflected light as illustrated in FIG. 2 by using a sensor such as a camera 103. Reference numeral 112 in FIG. 2 denotes an obstacle.

Then, from the obtained image 110, using the image coordinates of the camera 103, the scanning angle at that time, and the distance between the camera 103 and the emission point of the structured light, the distance between the emission point of the structured light and the obstacle 107 may be calculated by triangulation.

However, in the distance measurement device according to the prior art, the resolution decreases as the distance to the obstacle 107 increases as illustrated in FIG. 3. In other words, as the distance from the light source 101 to the obstacle 107 increases, the distance change at the same angular intervals increases, so that a distance error at a long distance increases.

In FIG. 3, as an example, there are four pixels (not illustrated) in the image sensor of the camera 103, and the structured light irradiated from the laser light source 101 enters the camera 103 from five positions separated by the same angular interval with respect to the camera 103.

In FIG. 3, light passing between points P1 and P2 is input to one pixel, light passing between points P2 and P3 is input to one pixel, light passing between points P3 and P4 is input to one pixel, and light passing between points P4 and P5 is input to one pixel. In this case, the spacing between the five points P1, P2, P3, P4, and P5 increases from P1 to P5. In other words, the interval G5 between the points P4 and P5 is much larger than the interval G1 between the points P1 and P2. Accordingly, as the distance to the obstacle 107 increases, the input distance per pixel increases, so that the resolution of the distant obstacle that can be distinguished by the camera 103 decreases. In other words, the distance measurement device 100 according to the prior art has a low far-field resolution.

This problem of low resolution at a long distance may be solved by using a sensor having a high resolution. However, there is a problem in that the price of the distance measurement device is increased because a sensor having a high resolution is expensive and a processor capable of processing it also requires high performance.

Another way to increase the far-field resolution is to increase the distance between the light source and the camera. However, increasing the distance between the light source and the camera increases the size of the distance measurement device. Thus, there is a problem in that the size of a device such as a mobile robot in which the distance measurement device is mounted may not be reduced.

Another way to increase the far-field resolution is to use an optical system with a narrow angle of view. However, when the optical system with a narrow angle of view is used, the horizontal angle of view is also reduced, and thus, there is a problem in that it is not suitable for a distance measurement device that requires a wide horizontal field of view.

Accordingly, there is a need for a distance measurement device capable of improving a far-field resolution without increasing cost and size, and without deteriorating the horizontal field of view.

DISCLOSURE OF INVENTION

Technical Problem

The disclosure is invented in view of the above problems, and relates to a wide-angle high-resolution distance measurement device having a wide angle of view in a horizontal direction and at the same time having a high far-field resolution.

Technical Solution

A wide-angle high-resolution distance measurement device according to an embodiment of the disclosure may include a light source configured to irradiate structured light; a camera configured to form an image by capturing reflected light, which is the structured light irradiated from the light source and reflected from an obstacle; and a resolution correction lens disposed in front of the camera and configured to correct the reflected light reflected from the obstacle and incident on the camera, wherein resolution of the image formed by the camera becomes uniform regardless of distance.

The resolution correction lens may be formed to sequentially change resolution so that a central portion has a high resolution and an outer peripheral portion has a low resolution.

The camera may include an image sensor, the light source may be disposed so that reflected light reflected from a distant obstacle is incident toward a first end of the image sensor, and reflected light reflected from a nearby obstacle is incident toward a second end of the image sensor, and the resolution correction lens may be disposed such that the central portion is adjacent to the first end of the image sensor and the outer peripheral portion is adjacent to the second end of the image sensor.

The resolution correction lens may have a circular cross-section, the image sensor may be formed in a rectangular flat plate, and the image sensor may be disposed such that the first end of the image sensor is spaced a predetermined distance downward from a straight line passing through a center of the resolution correction lens, and both corners of the second end of the image sensor are in contact with an inner surface of the circular cross-section of the resolution correction lens.

The resolution correction lens may have a circular cross-section, wherein the image sensor may be formed in a rectangular flat plate, and the image sensor may be disposed such that the first end of the image sensor is spaced a predetermined distance downward from a straight line passing through a center of the resolution correction lens, and the second end of the image sensor is in contact with an outer circumferential surface of the circular cross-section of the resolution correction lens.

The resolution correction lens may include a wide-angle lens.

The resolution correction lens may be formed to have a highest resolution at one end portion along an outer circumferential surface and a lowest resolution at another end portion facing the one end portion.

The camera may include an image sensor, the light source may be disposed so that reflected light reflected from a distant obstacle is incident toward a first end of the image sensor through the one end portion of the resolution correction lens, and reflected light reflected from a nearby obstacle is incident toward a second end of the image sensor through the another end portion of the resolution correction lens, and the resolution correction lens may be disposed such that its center coincides with a center of the image sensor.

The resolution correction lens may include a first axis and a second axis perpendicular to the first axis, and the resolution correction lens may be formed such that distortion in the second axis direction is greater than distortion in the first axis direction.

When the camera is wide-angle in a horizontal direction, the resolution correction lens may be a half-cylinder lens, and the half-cylinder lens may be disposed such that the first axis is parallel to the structured light irradiated from the light source.

When the camera is narrow angle in a horizontal direction, the resolution correction lens may be a double-concave cylinder lens, and the double-concave cylinder lens may be disposed such that the second axis is parallel to the structured light irradiated from the light source.

The wide-angle high-resolution distance measurement device may include a processor configured to control the light source and the camera, wherein the processor may control so that the light source turns on at predetermined time intervals to irradiate structured light and the camera captures an image.

When the camera captures an image while the light source is not turned on, the processor may shift a timing of turning on the light source by a predetermined time.

Advantageous Effects

With a wide-angle high-resolution distance measurement device according to an embodiment of the disclosure, when a wide-angle lens is used to obtain a wide horizontal angle of view and a far-field resolution is lowered, a resolution correction lens is used to maintain a horizontal angle of view and improve the far-field resolution.

BEST MODE FOR CARRYING OUT THE INVENTION

Hereinafter, embodiments of a wide-angle high-resolution distance measurement device according to the disclosure will be described in detail with reference to the accompanying drawings.

The embodiments described hereinafter are illustratively shown to aid understanding of the disclosure. It should be understood that the disclosure may be variously modified and implemented differently from the embodiments described herein. However, well-known functions or constructions are omitted to provide a clear and concise description of exemplary embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Figure 4:
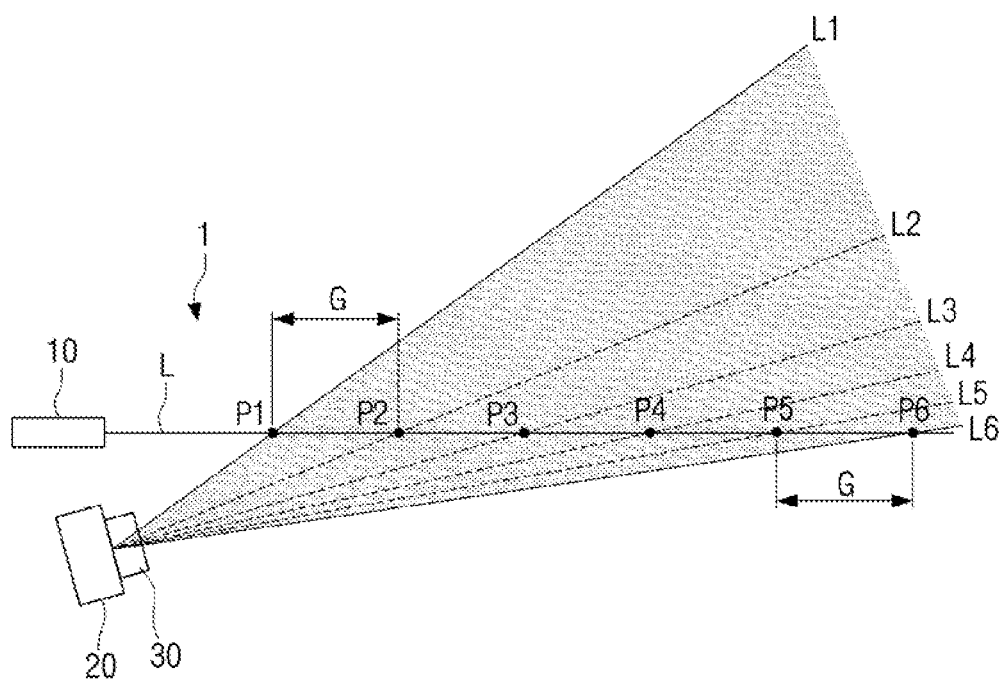
FIG. 4 is a side view illustrating a wide-angle high-resolution distance measurement device according to an embodiment of the disclosure.
Figure 5:
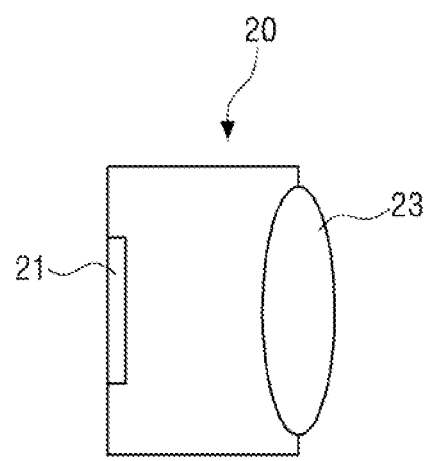
FIG. 5 is a cross-sectional view schematically illustrating a structure of a camera used in FIG. 4.
Figure 6:
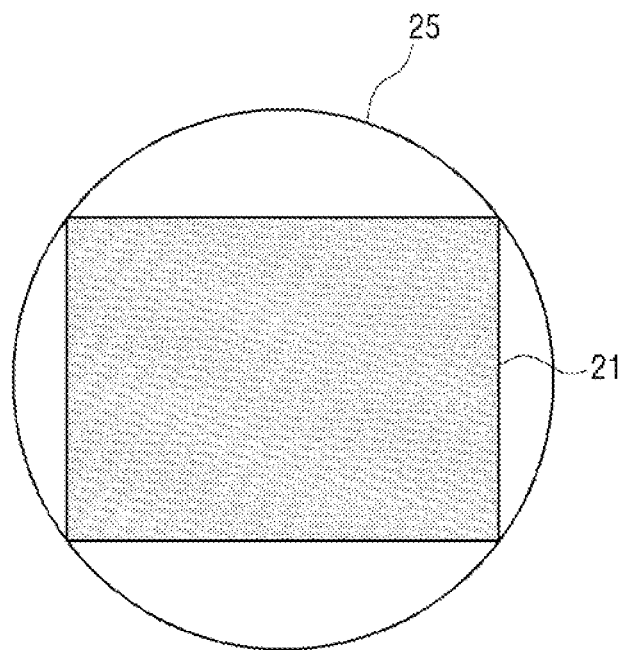
FIG. 6 is a view illustrating a relationship between a lens and an image sensor of a camera.
Figure 7:
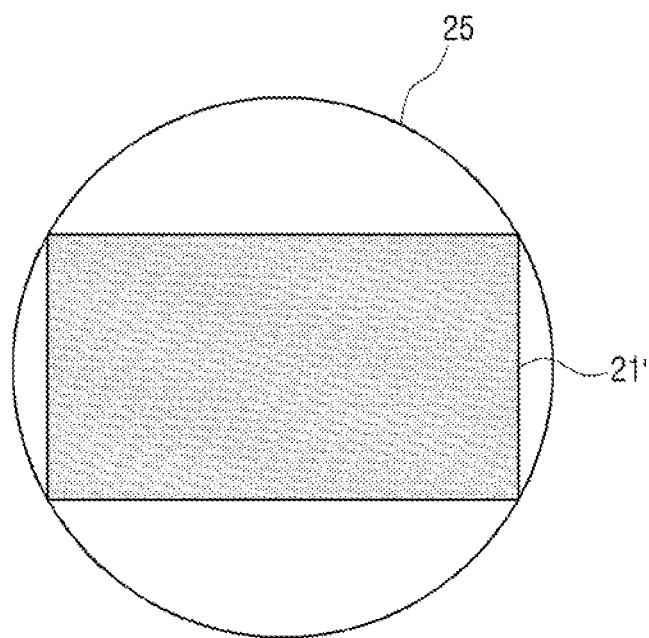
FIG. 7 is a view illustrating a relationship between a lens and an image sensor of a camera.

FIG. 4 is a side view illustrating a wide-angle high-resolution distance measurement device according to an embodiment of the disclosure. FIG. 5 is a cross-sectional view schematically illustrating a structure of a camera used in FIG. 4. FIG. 6 is a view illustrating a relationship between a lens and an image sensor of a camera, and FIG. 7 is a view illustrating a relationship between a lens and an image sensor of a camera.

Referring to FIG. 4, a wide-angle high-resolution distance measurement device 1 according to an embodiment of the disclosure may include a light source 10, a camera 20, and a resolution correction lens 30.

Figure 1:
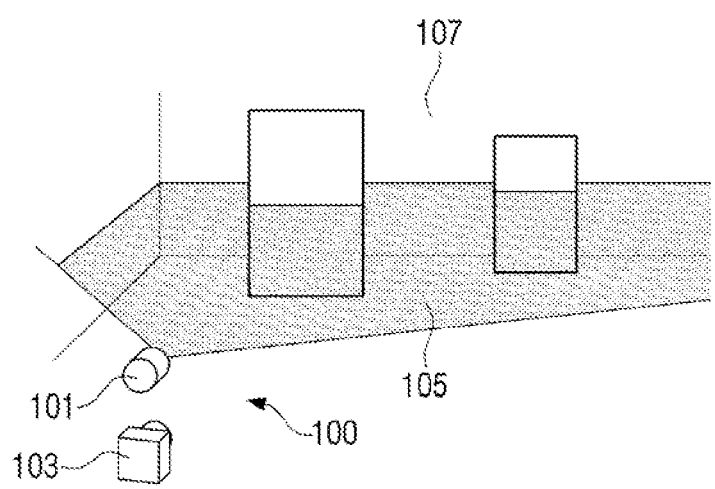
FIG. 1 is a perspective view illustrating a distance measurement device according to the prior art.
Figure 2:
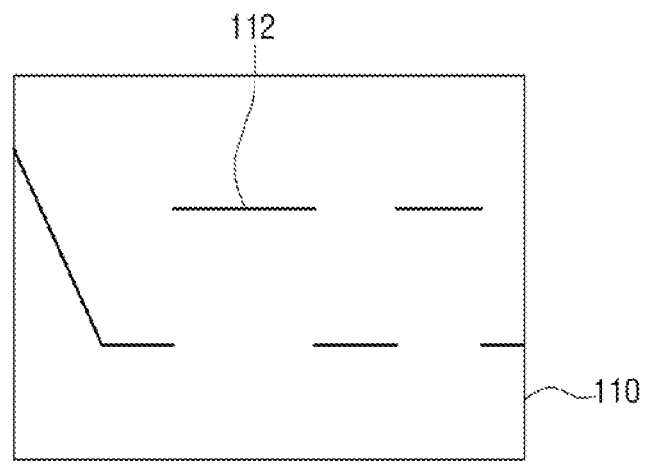
FIG. 2 is a view illustrating an image captured by a camera of FIG. 1.
Figure 3:
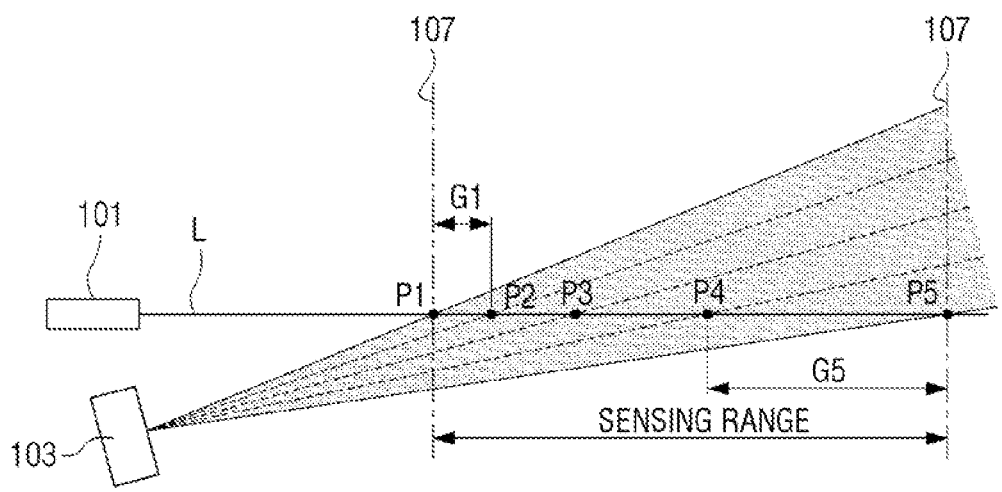
FIG. 3 is a side view illustrating the distance measurement device of FIG. 1.

The light source 10 may be formed to irradiate structured light having a predetermined shape. In the case of this embodiment, a line laser is used as the light source 10. As illustrated in FIG. 1, the line laser 10 may be formed to irradiate the structured light in a straight line to the obstacle 107. In other words, the line laser 10 may be formed to output flat light in a fan shape.

The camera 20 may be disposed under the light source 10. In other words, the light source 10 and the camera 20 may be arranged so that the center line of the light source 10 and the center line of the camera 20 are positioned on the same virtual vertical plane. The camera 20 may be configured to capture reflected light, which is the structured light that is irradiated from the light source 10, is reflected from an obstacle, and then enters the camera 20, to form an image. As illustrated in FIG. 5, the camera 20 may include an image sensor 21 and a focus lens 23 to focus light on the image sensor 21.

The image sensor 21 may be configured to form an image by capturing reflected light reflected from an obstacle. The image sensor 21 may be formed as a flat plate having a substantially rectangular shape, and may be formed in a form in which a plurality of pixels are integrated. The image sensor 21 may use the same image sensor used in the distance measurement device according to the prior art. For example, an image sensor of 5 to 10 million pixels may be used. The aspect ratio of the image sensor 21 may be 4:3 or 16:9.

The focus lens 23 may be formed so that the reflected light reflected from the obstacle is incident to focus on the image sensor 21. In the embodiment illustrated in FIG. 5, the focus lens 23 is formed of one lens, but the focus lens 23 is not limited thereto. The focus lens 23 may be formed as a lens assembly including two or more lenses as long as it can focus the reflected light on the image sensor.

In general, because light paths in all directions incident on a lens are the same, the angle of view may be determined according to the size of the image sensor 21. For example, when a lens 25 having a horizontal angle of view of 90 degrees is used and the image sensor 21 has the aspect ratio of 4:3 as illustrated in FIG. 6, the vertical angle of view is 67.5 degrees. When the image sensor 21' has the aspect ratio of 16:9 as illustrated in FIG. 7, the vertical angle of view is 50.6 degrees. In other words, when a wide-angle lens with a wide horizontal angle of view is used to widen the field of view, the vertical angle of view also increases at the same time. As the vertical angle of view increases, the far-field resolution of the distance measurement device may deteriorate. In order to improve the far-field resolution, it is necessary to reduce the vertical angle of view.

Accordingly, the wide-angle high-resolution distance measurement device 1 according to an embodiment of the disclosure may use the resolution correction lens 30 to widen the horizontal angle of view and narrow the vertical angle of view.

The resolution correction lens 30 may be disposed in front of the camera 20, and may be configured to correct the reflected light, which is reflected from the obstacle and incident on the camera 20, so that the resolution of the image formed on the image sensor 21 of the camera 20 is uniform. The resolution correction lens 30 may be manufactured separately from the camera 20 and disposed in front of the camera 20. Alternatively, as another example, the resolution correction lens 30 may be integrally formed with the focus lens 23 in front of the focus lens 23 of the camera 20. As another example, the resolution correction lens 30 may be formed as a lens assembly including two or more lenses instead of a single lens.

Here, the uniform resolution means that the intervals between the plurality of points P1, P2, P3, P4, P5, and P6 positioned on the light beam L irradiated from the light source 10 are the same as illustrated in FIG. 4. In this case, each of the intervals G between the pluralities of points corresponds to one pixel of the image sensor 21. As described above, when the intervals G between the plurality of points are all the same, light having the same interval is input to one pixel regardless of the distance, so that the image sensor 21 may accurately recognize the obstacle regardless of the distance. Accordingly, the far-field resolution of the distance measurement device 1 may be improved.

In order to explain the relationship between the resolution and the distance to the obstacle, FIG. 4 illustrates the case that the image sensor 21 of the camera 20 has five pixels (not illustrated) and the structured light irradiated from the light source 10 is inputted to the pixels of the image sensor 21 from six positions P1, P2, P3, P4, P5, and P6. In FIG. 4, light passing between P1 and P2 is input to one pixel, light passing between P2 and P3 is input to one pixel, light passing between P3 and P4 is input to one pixel, light passing between P4 and P5 is input to one pixel, and light passing between P5 and P6 is input to one pixel. In this case, the intervals G between six points are the same. In other words, the interval G between the points P1 and P2, the interval G between the points P2 and P3, the interval G between the points P3 and P4, the interval G between the points P4 and P5, and the interval G between the points P5 and P6 are all the same.

However, unlike the distance measurement device 100 according to the prior art, angles between the lines L1, L2, L3, L4, L5, and L6 which connect the pixels of the image sensor 21 and the points P1, P2, P3, P4, P5, and P6 are different. In other words, the angle between the two lines L1 and L2 passing through one pixel and the points P1 and P2, the angle between the two lines L2 and L3 passing through one pixel and the points P2 and P3, the angle between the two lines L3 and L4 passing through one pixel and the points P3 and P4, the angle between the two lines L4 and L5 passing through one pixel and the points P4 and P5, and the angle between the two lines L5 and L6 passing through one pixel and the points P5 and P6 are all different. The angle between the two lines L1 and L2 passing through one pixel and the points P1 and P2 is the largest, the angle between two lines gradually decreases, and the angle between the two lines L5 and L6 passing through one pixel and the points P5 and P6 is the smallest.

In order to make the resolution of light input to the image sensor 21 uniform as described above, in the case of this embodiment, a wide-angle lens having a central portion 31 with a high resolution and an outer peripheral portion 32 with a low resolution is used as the resolution correction lens 30. The resolution correction lens 30 may be designed so that the central portion 31 thereof has a high resolution, the outer peripheral portion 32 thereof has a low resolution, and the resolution between the central portion 31 and the outer peripheral portion 32 changes sequentially by using lens distortion.

In this case, the light source 10 and the image sensor 21 are disposed so that the reflected light reflected from a long distance passes through the central portion 31 of the resolution correction lens 30 and enters the image sensor 21. In detail, the light source 10 is disposed so that the reflected light reflected from a distant obstacle is incident toward the first end 21a (see FIG. 8) of the image sensor 21 and the reflected light reflected from a nearby obstacle is incident toward the second end 21b (see FIG. 8) of the image sensor 21 facing the first end 21a. At this time, the resolution correction lens 30 is disposed such that the central portion 31 is adjacent to the first end 21a of the image sensor 21 and the outer peripheral portion 32 is adjacent to the second end 21b of the image sensor 21.

Hereinafter, the arrangement of the resolution correction lens and the image sensor will be described in detail with reference to FIGS. 8 and 9.

Figure 8:
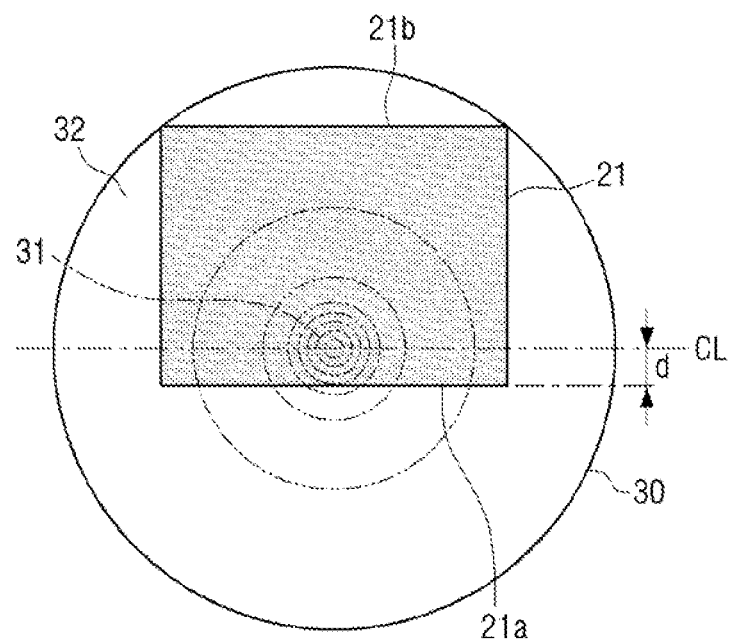
FIG. 8 is a view illustrating an arrangement relationship between an image sensor and a resolution correction lens in the wide-angle high-resolution distance measurement device of FIG. 4.

FIG. 8 is a view illustrating an arrangement relationship between an image sensor and a resolution correction lens in the wide-angle high-resolution distance measurement device of FIG. 4.

Referring to FIG. 8, the resolution correction lens 30 may have a circular cross-section, and may be formed so that the resolution decreases from the central portion 31 toward the outer peripheral portion 32. In other words, the central portion 31 of the resolution correction lens 30 is high-resolution, and the outer peripheral portion 32 is low-resolution. As an example of the resolution correction lens 30, a general wide-angle lens may be used.

The image sensor 21 may be formed in a rectangular flat plate. In this embodiment, the image sensor 21 has the aspect ratio of 4:3. The image sensor 21 is disposed such that the first end 21a of the image sensor 21 is located below a predetermined distance d from the center line CL in parallel with the center line CL passing through the center of the resolution correction lens 30 and both corners of the second end 21b of the image sensor 21 contact the inner surface of the circular cross-section of the resolution correction lens 30. In this case, the distance d between the image sensor 21 and the center line CL of the resolution correction lens 30 may be determined by a high-resolution region of the resolution correction lens 30 that can increase the far-field resolution. As another example, although not illustrated, the first end 21a of the image sensor 21 may be disposed to coincide with the center line CL of the resolution correction lens 30.

In FIG. 8, the reflected light reflected from a short distance is incident on the upper end portion of the image sensor 21, that is, toward the second end 21b, and the reflected light reflected from a far distance is incident on the lower end portion of the image sensor 21, that is, toward the first end 21a. In other words, the reflected light reflected from the short distance enters the image sensor 21 through the outer peripheral portion 32 of the resolution correction lens 30 having a low-resolution, and the reflected light reflected from the far distance enters the image sensor 21 through the central portion 31 of the resolution correction lens 30 having a high-resolution.

Figure 9:
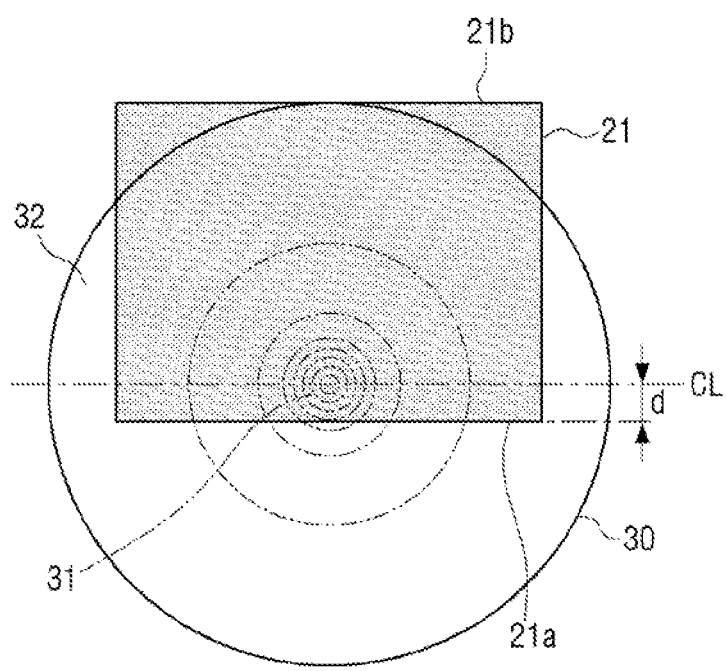
FIG. 9 is a view illustrating another example of an arrangement relationship between an image sensor and a resolution correction lens in the wide-angle high-resolution distance measurement device of FIG. 4.

FIG. 9 is a view illustrating another example of an arrangement relationship between an image sensor and a resolution correction lens in the wide-angle high-resolution distance measurement device of FIG. 4.

Referring to FIG. 9, the resolution correction lens 30 may have a circular cross-section, and may be formed so that the resolution decreases from the central portion 31 toward the outer peripheral portion 32. In other words, the central portion 31 of the resolution correction lens 30 is high-resolution, and the outer peripheral portion 32 is low-resolution. As an example of the resolution correction lens 30, a general wide-angle lens may be used.

The image sensor 21 may be formed in a rectangular flat plate. In this embodiment, the image sensor 21 has the aspect ratio of 4:3. The image sensor 21 is disposed such that the first end 21a of the image sensor 21 is located below a predetermined distance d from the center line CL in parallel with the center line CL passing through the center of the resolution correction lens 30 and the second end 21b of the image sensor 21 is in contact with the outer circumferential surface of the circular cross-section of the resolution correction lens 30. In this case, the distance d between the image sensor 21 and the center line CL of the resolution correction lens 30 may be determined by a high-resolution region of the resolution correction lens 30 capable of increasing the far-field resolution. As another example, although not illustrated, the first end 21a of the image sensor 21 may be disposed to coincide with the center line CL of the resolution correction lens 30.

In FIG. 9, the reflected light reflected from a short distance is incident on the upper end portion of the image sensor 21, that is, toward the second end 21b, and the reflected light reflected from a far distance is incident on the lower end portion of the image sensor 21, that is, toward the first end 21a. Therefore, the reflected light reflected from the short distance enters the image sensor 21 through the outer peripheral portion 32 of the resolution correction lens 30 having a low-resolution, and the reflected light reflected from the far distance enters the image sensor 21 through the central portion 31 of the resolution correction lens 30 having a high-resolution.

Accordingly, when the arrangement of the resolution correction lens 30 and the image sensor 21 as illustrated in FIGS. 8 and 9 is used, the interval of light input to each pixel of the image sensor 21 may be formed approximately identically as illustrated in FIG. 4. Therefore, the far-field resolution of the distance measurement device may be improved.

For example, when the resolution correction lens 30 and the image sensor 21 are arranged as described above, the wide-angle high-resolution distance measurement device 1 according to an embodiment of the disclosure may detect an obstacle with an error of about 1% at a long distance (for example, 6 M) indoors, and may detect an obstacle with an error of about 1% at a long distance (for example, 15 M) outdoors.

In addition, when the resolution correction lens 30 is formed in a circular shape as illustrated in FIGS. 8 and 9, there is an advantage in that it is easy to manufacture the resolution correction lens 30.

In the above, the center of the image sensor 21 and the center of the resolution correction lens 30 are arranged to be eccentric. However, the image sensor 21 and the resolution correction lens 30 may be disposed so that the center of the image sensor 21 and the center of the resolution correction lens 30 are aligned with each other as illustrated in FIG. 10.

Figure 10:
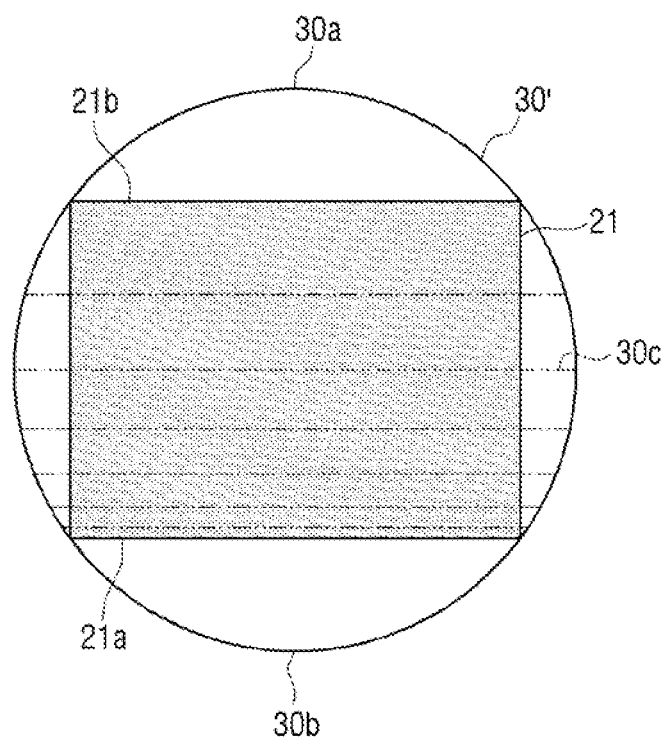
FIG. 10 is a view illustrating another example of an arrangement relationship between an image sensor and a resolution correction lens in the wide-angle high-resolution distance measurement device of FIG. 4.

FIG. 10 is a view illustrating another example of an arrangement relationship between an image sensor and a resolution correction lens in the wide-angle high-resolution distance measurement device of FIG. 4.

The resolution correction lens 30' may have a circular cross-section and may be formed to have the highest resolution at one end of the outer circumferential surface of the resolution correction lens 30' and the lowest resolution at the other end of the outer circumferential surface opposite to the one end thereof. For example, in FIG. 10, the resolution correction lens 30' may be formed so that the resolution gradually decreases from the upper end 30a to the lower end 30b. In other words, the upper portion adjacent to the upper end 30a of the resolution correction lens 30' is high-resolution, and the lower portion adjacent to the lower end 30b thereof is low-resolution. In addition, the resolution of the middle portion between the upper end 30a and the lower end 30b is formed to change sequentially in parallel with the upper end of the image sensor 21. In FIG. 10, a plurality of parallel dotted lines 30c indicate a region in which the resolution is changed.

The image sensor 21 may be formed in a rectangular flat plate. In this embodiment, the image sensor 21 has the aspect ratio of 4:3. The image sensor 21 is disposed so that the center of the image sensor 21 is aligned with the center of the resolution correction lens 30'.

In FIG. 10, the reflected light reflected from a short distance is incident on the lower end portion of the image sensor 21, that is, toward the first end 21a, and the reflected light reflected from a far distance is incident on the upper end portion of the image sensor 21, that is, toward the second end 21b. Therefore, the reflected light reflected from the short distance enters the image sensor 21 through the lower end portion of the resolution correction lens 30' having a low-resolution, and the reflected light reflected from the far distance enters the image sensor 21 through the upper end portion of the resolution correction lens 30' having a high-resolution.

In the case of the embodiment illustrated in FIG. 10, although not illustrated, the resolution correction lens may be formed to have a rectangular cross-section corresponding to the image sensor 21 rather than a circular shape.

Hereinafter, a wide-angle high-resolution distance measurement device according to another embodiment of the disclosure will be described in detail with reference to FIGS. 11 to 13.

Figure 11:
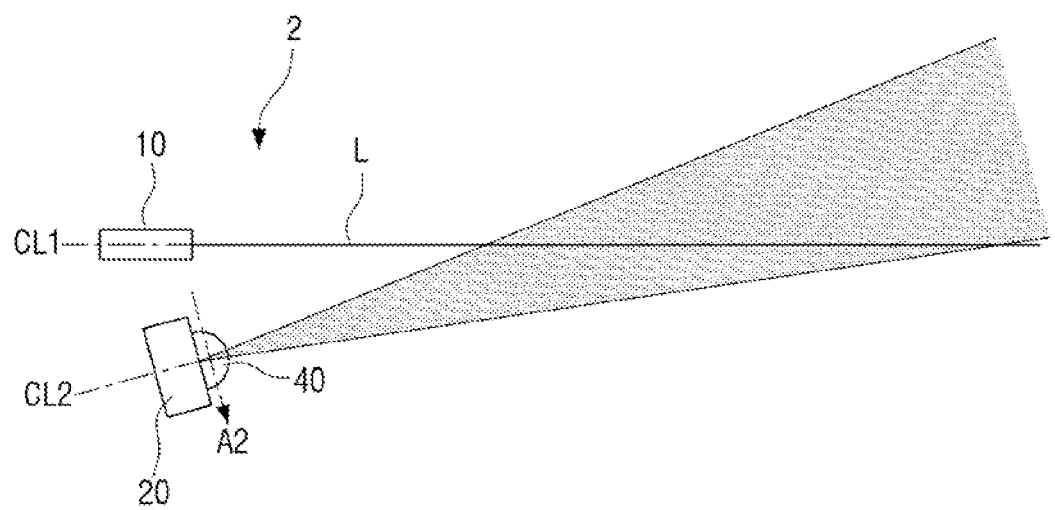
FIG. 11 is a side view illustrating a wide-angle high-resolution distance measurement device according to another embodiment of the disclosure.

FIG. 11 is a side view illustrating a wide-angle high-resolution distance measurement device according to another embodiment of the disclosure. FIG. 12 is a plan view illustrating the wide-angle high-resolution distance measurement device of FIG. 11, and FIG. 13 is a perspective view illustrating a half-cylinder lens used in the wide-angle high-resolution distance measurement device of FIG. 11.

Figure 12:
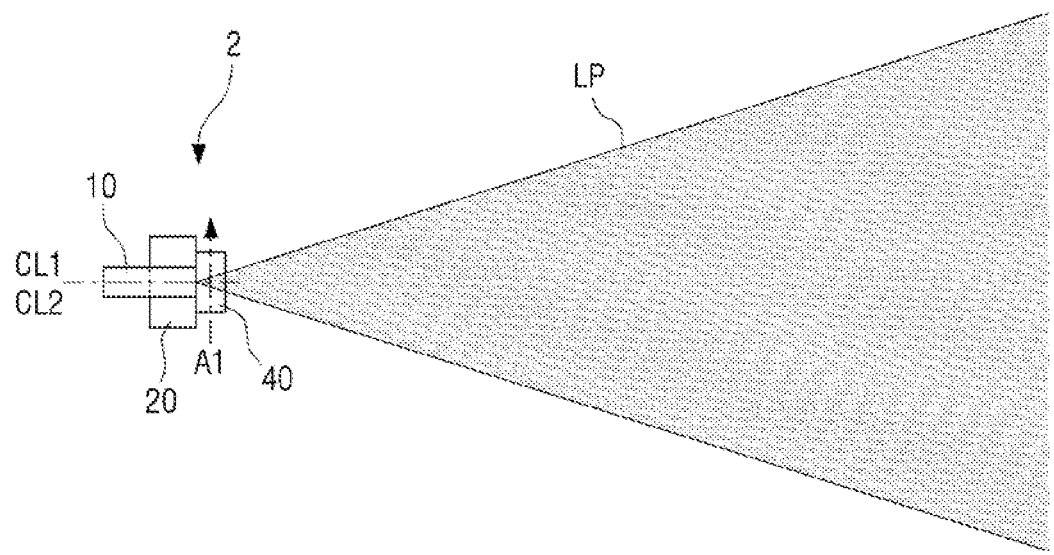
FIG. 12 is a plan view illustrating the wide-angle high-resolution distance measurement device of FIG. 11.
Figure 13:
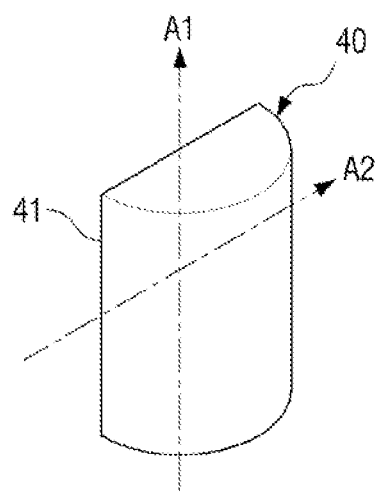
FIG. 13 is a perspective view illustrating a half-cylinder lens used in the wide-angle high-resolution distance measurement device of FIG. 11.

Referring to FIGS. 11 to 13, a wide-angle high-resolution distance measurement device 2 according to an embodiment of the disclosure may include a light source 10, a camera 20, and a resolution correction lens 40.

The light source 10 may be formed to irradiate structured light having a predetermined shape. In the case of this embodiment, a line laser is used as the light source 10. As illustrated in FIG. 1, the line laser 10 may irradiate the structured light in a straight line to the obstacle 107. In other words, the line laser 10 may be formed to output flat light in a fan shape.

The camera 20 may be disposed under the light source 10. In other words, the light source 10 and the camera 20 may be arranged so that the center line CL1 of the light source 10 and the center line CL2 of the camera 20 are positioned on the same virtual vertical plane. The camera 20 may be configured to capture reflected light, which is the structured light that is irradiated from the light source 10, is reflected from an obstacle, and then enters the camera 20, to form an image. The camera 20 may include an image sensor 21 and a focus lens 23 to focus light on the image sensor 21 (see FIG. 5). In addition, the camera 20 may use a lens having a wide angle in the horizontal direction. For example, a camera 20 having a horizontal angle of view of 90 degrees and a vertical angle of view of about 60 degrees may be used.

A lens in which distortion in one direction is greater than distortion in the other direction may be used as the resolution correction lens 40. For example, the resolution correction lens 40 may have a first axis A1 and a second axis A2 perpendicular to the first axis A1, and may be formed so that the distortion in the direction of the second axis A2 is greater than the distortion in the direction of the first axis A1. In this case, the resolution correction lens 40 may be disposed so that the direction of the second axis A2 having a large distortion coincides with the direction in which the angle of view is to be changed. Accordingly, the resolution correction lens 40 may be disposed in front of the camera 20 so that the direction of the first axis A1 having a small distortion is parallel to the light plane LP formed by the structured light irradiated from the light source 10.

As in the embodiment illustrated in FIGS. 11 and 12, when the camera 20 uses a lens having a wide-angle in the horizontal direction, a half-cylinder lens may be used as the resolution correction lens 40 to reduce the angle of view in the vertical direction. For example, the half-cylinder lens 40 may be used to reduce a vertical angle of view of about 60 degrees to about 20 degrees. FIG. 13 illustrates an example of the half-cylinder lens 40.

Referring to FIG. 13, the half-cylinder lens 40 may include a first axis A1 and a second axis A2 perpendicular to each other on a rectangular plane 41. The first axis A1 is an axis in the vertical direction of the half-cylinder lens 40, and the second axis A2 is an axis of the width direction of the half-cylinder lens 40 and perpendicular to the first axis A1 on the rectangular plane 41. Because the shape is uniform in the direction of the first axis A1, there is almost no distortion. However, distortion exists in the direction of the second axis A2, that is, in the width direction of the half-cylinder lens 40. Accordingly, the distortion in the direction of the second axis A2 is greater than the distortion in the direction of the first axis A1.

Therefore, in order to reduce the angle of view in the vertical direction, as illustrated in FIGS. 11 and 12, the half-cylinder lens 40 may be disposed in front of the camera 20 so that the second axis A2 of the half-cylinder lens 40 is parallel to the virtual vertical plane in which the light source 10 and the camera 20 are disposed. When the half-cylinder lens 40 is disposed in front of the camera 20 as described above, the angle of view in the vertical direction of the camera 20 may be reduced, so that the light intervals of the reflected light incident on the camera 20 are made uniform regardless of the distance, thereby increasing the resolution.

Accordingly, with the wide-angle high-resolution distance measurement device 2 according to an embodiment of the disclosure as illustrated in FIGS. 11 and 12, because the angle of view in the horizontal direction may be maintained at a wide angle and the angle of view in the vertical direction may be set to a narrow angle, the far-field resolution may be increased.

Hereinafter, a wide-angle high-resolution distance measurement device according to another embodiment of the disclosure will be described in detail with reference to FIGS. 14 to 16.

Figure 14:
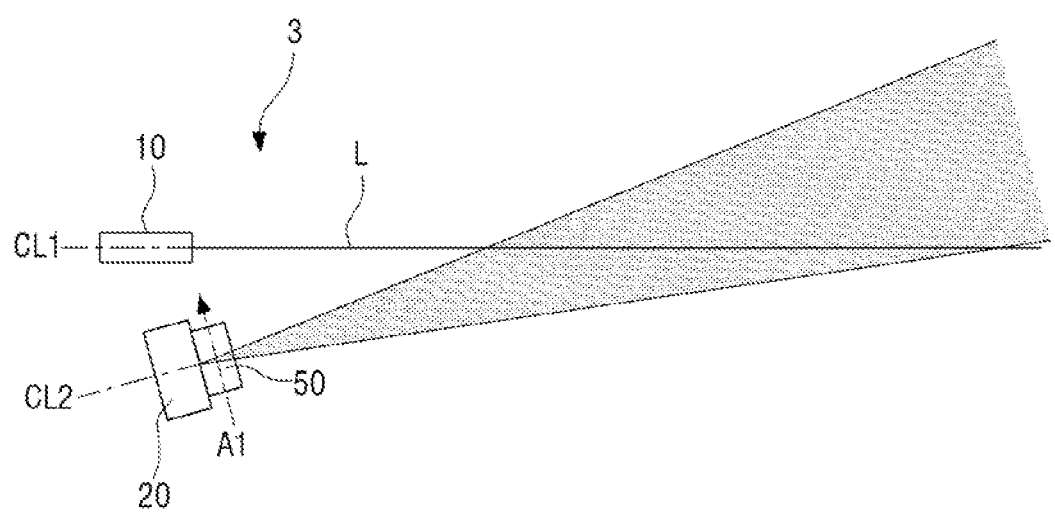
FIG. 14 is a side view illustrating a wide-angle high-resolution distance measurement device according to another embodiment of the disclosure.

FIG. 14 is a side view illustrating a wide-angle high-resolution distance measurement device according to another embodiment of the disclosure. FIG. 15 is a plan view illustrating the wide-angle high-resolution distance measurement device of FIG. 14, and FIG. 16 is a perspective view illustrating a double-concave cylinder lens used in the wide-angle high-resolution distance measurement device of FIG. 14.

Figure 15:
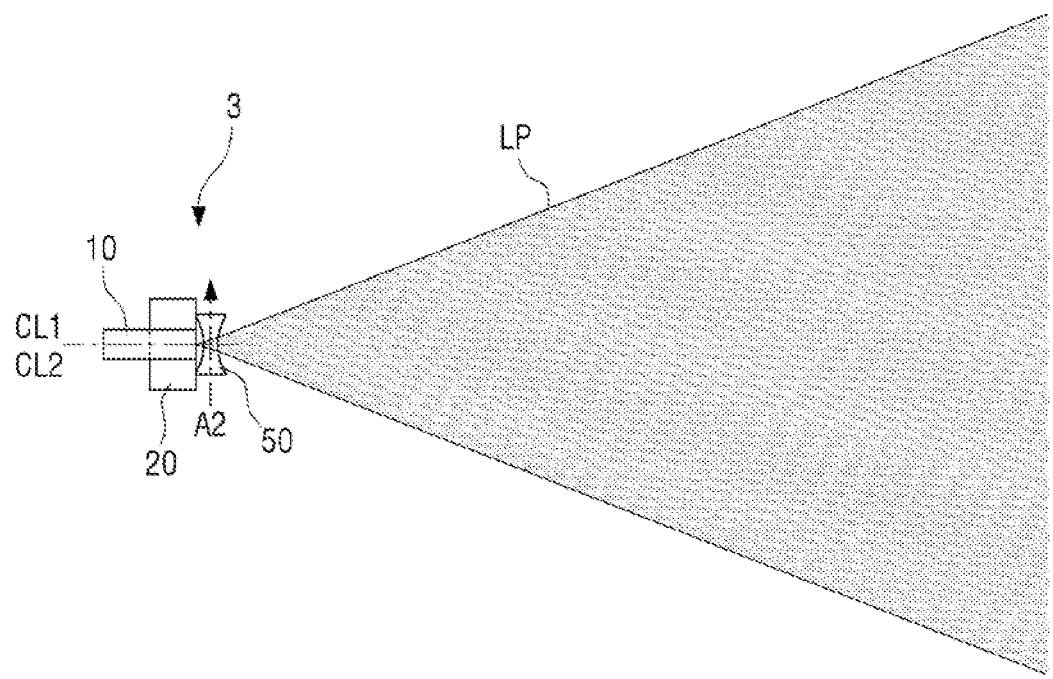
FIG. 15 is a plan view illustrating the wide-angle high-resolution distance measurement device of FIG. 14.
Figure 16:
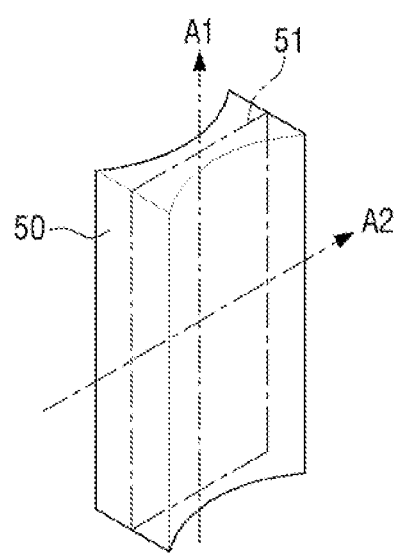
FIG. 16 is a perspective view illustrating a double-concave cylinder lens used in the wide-angle high-resolution distance measurement device of FIG. 14.

Referring to FIGS. 14 to 16, a wide-angle high-resolution distance measurement device 3 according to an embodiment of the disclosure may include a light source 10, a camera 20, and a resolution correction lens 50.

The light source 10 may be formed to irradiate structured light having a predetermined shape. In the case of this embodiment, a line laser is used as the light source 10. As illustrated in FIG. 1, the line laser 10 may irradiate the structured light in a straight line to the obstacle 107. In other words, the line laser 10 may be formed to output flat light in a fan shape.

The camera 20 may be disposed under the light source 10. In other words, the light source 10 and the camera 20 may be arranged so that the center line CL1 of the light source 10 and the center line CL2 of the camera 20 are positioned on the same virtual vertical plane. The camera 20 may be configured to capture reflected light, which is the structured light that is irradiated from the light source 10, is reflected from an obstacle, and then enters the camera 20, to form an image. The camera 20 may include an image sensor 21 and a focus lens 23 to focus light on the image sensor 21 (see FIG. 5). In addition, the camera 20 may use a lens having a narrow angle in the horizontal direction. For example, a camera 20 having a horizontal angle of view of 30 degrees and a vertical angle of view of 20 degrees may be used. In this case, the angle of view in the horizontal direction of the camera 20 may be widened in order to widen the field of view of the distance measurement device 3.

As the resolution correction lens 50, a lens in which distortion in one direction is greater than distortion in the other direction may be used in order to increase the angle of view in the horizontal direction, for example, to increase the angle of view in the horizontal direction from 30 degrees to 90 degrees. For example, the resolution correction lens 50 may have a first axis A1 and a second axis A2 perpendicular to the first axis A1, and may be formed so that the distortion in the direction of the second axis A2 is greater than the distortion in the direction of the first axis A1. In this case, the resolution correction lens 50 may be disposed so that the direction of the second axis A2 having a large distortion coincides with the direction in which the angle of view is to be changed. Accordingly, the resolution correction lens 50 may be disposed in front of the camera 20 so that the direction of the second axis A2 having a large distortion is parallel to the structured light irradiated from the light source 10.

As in the embodiment illustrated in FIGS. 14 and 15, when the camera 20 uses a lens having a narrow angle in the horizontal direction, a double-concave cylinder lens may be used as the resolution correction lens 50 to increase the angle of view in the horizontal direction. For example, the double-concave cylinder lens 50 capable of increasing the horizontal angle of view of the camera 20 from 30 degrees to 90 degrees may be used. FIG. 16 illustrates an example of the double-concave cylinder lens 50.

Referring to FIG. 16, the double-concave cylinder lens 50 may be formed in a shape in which concave grooves are formed in a longitudinal direction in a rectangular flat plate. In other words, the double-concave cylinder lens 50 has a concave shape on each of both side surfaces, so that the middle portion of the flat plate is thinner than the edge thereof. Because the double-concave cylinder lens 50 functions as a general concave lens, the double-concave cylinder lens 50 may spread incident light. The double-concave cylinder lens 50 may include a first axis A1 and a second axis A2 perpendicular to each other on an imaginary central plane 51. The first axis A1 is an axis extending in the vertical direction of the double-concave cylinder lens 50 on the central plane 51, and the second axis A2 is an axis perpendicular to the first axis A1 and extending in the left-right direction of the double-concave cylinder lens 50 on the central plane 51. Because the shape is uniform in the direction of the first axis A1, there is almost no distortion. However, distortion exists in the direction of the second axis A2, that is, in the width direction of the double-concave cylinder lens 50. Accordingly, the distortion in the direction of the second axis A2 is greater than the distortion in the direction of the first axis A1.

Therefore, in order to increase the angle of view in the horizontal direction, as illustrated in FIGS. 14 and 15, the double-concave cylinder lens 50 may be disposed in front of the camera 20 so that the second axis A2 of the double-concave cylinder lens 50 is parallel to the light plane LP formed by the structured light irradiated from the light source 10. When the double-concave cylinder lens 50 is disposed in front of the camera 20 as described above, the horizontal angle of view of the camera 20 may be increased, so that the horizontal angle of view of the camera 20 may be made a wide angle.

Accordingly, with the wide-angle high-resolution distance measurement device 3 according to an embodiment of the disclosure as illustrated in FIGS. 14 and 15, because the angle of view in the vertical direction of the camera 20 may be maintained at a narrow angle and the angle of view in the horizontal direction may be increased to a wide angle, the field of view may be increased while maintaining high resolution at a long distance.

In the above description, the resolution correction lenses 40 and 50 are used as an optical system disposed in front of the camera 20 to adjust the angle of view. However, the lens may not be used as the optical system for adjusting the angle of view. As another example, although not illustrated, a wide-angle high-resolution distance measurement device according to an embodiment of the disclosure may be configured using a concave mirror or a convex mirror capable of functioning the same as the lens.

A plurality of mobile robots having the wide-angle high-resolution distance measurement devices 1, 2, and 3 according to an embodiment of the disclosure may be used. In this case, light interference may occur due to structured lights irradiated from light sources of the plurality of wide-angle high-resolution distance measurement devices.

Hereinafter, a method of preventing light interference occurring when a plurality of wide-angle high-resolution distance measurement devices are used will be described in detail with reference to FIGS. 17 to 19.

Figure 17:
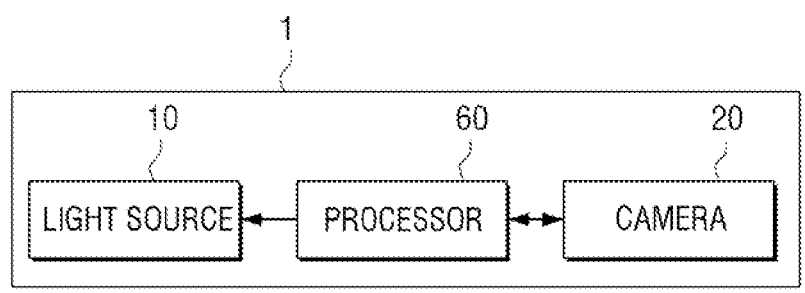
FIG. 17 is a functional block diagram illustrating a wide-angle high-resolution distance measurement device according to an embodiment of the disclosure.

FIG. 17 is a functional block diagram illustrating a wide-angle high-resolution distance measurement device according to an embodiment of the disclosure. FIG. 18 is a diagram illustrating time charts of light sources when light interference occurs between two wide-angle high-resolution distance measurement devices according to an embodiment of the disclosure disposed in two mobile robots. FIG. 19 is a diagram illustrating time charts of light sources when light interference between two wide-angle high-resolution distance measurement devices according to an embodiment of the disclosure disposed in two mobile robots is avoided.

Referring to FIG. 17, a wide-angle high-resolution distance measurement device 1 according to an embodiment of the disclosure may include a light source 10, a camera 20, and a processor 60.

The light source 10 may be configured to irradiate structured light, and the camera 20 may be configured to form an image by capturing reflected light that is reflected from an obstacle and incident on the camera 20. The light source 10 and the camera 20 are the same as or similar to the light source 10 and the camera 20 according to the above-described embodiment; therefore, detailed descriptions thereof are omitted.

The processor 60 may be configured to control the light source 10 and the camera 20, and identify a distance to an obstacle using a position when the light source 10 emits light. In detail, the processor 60 turns on the light source 10 at predetermined intervals to irradiate the structured light, and controls the camera 20 to form an image by capturing the reflected light, which is the structured light reflected by an obstacle and incident on the camera 20. In this case, the processor 60 may synchronously control the light source 10 and the camera 20 to form an image only when the light source 10 is turned on. In addition, the processor 60 may calculate the distance to the obstacle using the distance between the light source 10 and the camera 20 and the acquired image.

Figure 18:
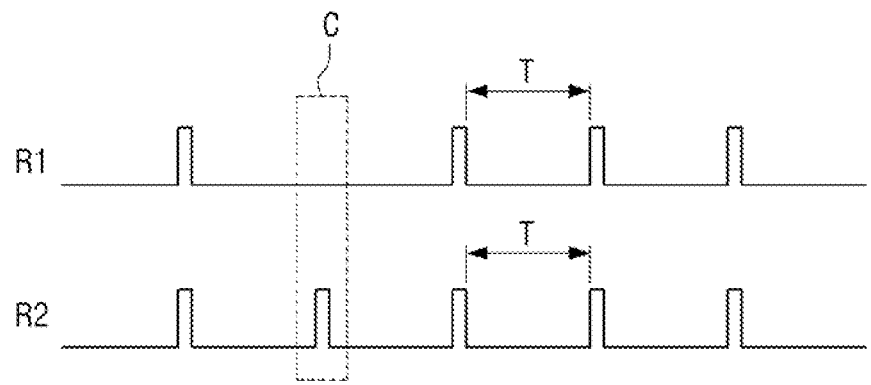
FIG. 18 is a diagram illustrating time charts of light sources when light interference occurs between two wide-angle high-resolution distance measurement devices according to an embodiment of the disclosure disposed in two mobile robots.

As illustrated in FIG. 18, the processor 60 may control the light source 10 to emit structured light at a predetermined time interval.

However, when two or more mobile robots R1 and R2 equipped with a wide-angle high-resolution distance measurement device 1 according to an embodiment of the disclosure are used, the light sources 10 of two distance measurement devices 1 emit light, so that light interference may occur between the two distance measurement devices 1.

For example, when a structured light signal is captured by the camera 20 in the state that the light source 10 is not turned on, the processor 60 of the distance measurement device 1 of a first mobile robot R1 identifies that light interference is occurred by the distance measurement device 1 of a second mobile robot R2. Then, the processor 60 of the distance measurement device 1 of the first mobile robot R1 may shift the timing of turning on the light source 10 by a predetermined time to avoid the light interference.

In detail, as illustrated in FIG. 18, the light source 10 of the distance measurement device 1 of the first mobile robot R1 may emit structured light at a predetermined time interval in the form of pulses, and the light source 10 of the distance measurement device 1 of the second mobile robot R2 may emit structured light in the form of pulses. At this time, when the processor 60 of the distance measurement device 1 of the first mobile robot R1 detects a structured light signal through the camera 20 in the state that the processor 60 does not turn on the light source 10 at the timing to turn on the light source 10 (part C in FIG. 18), it may be seen that light interference is occurred due to the structured light irradiated from the light source 10 of the second mobile robot R2.

Figure 19:
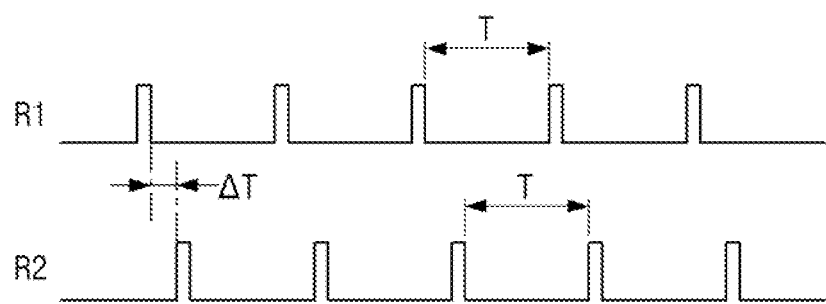
FIG. 19 is a diagram illustrating time charts of light sources when light interference between two wide-angle high-resolution distance measurement devices according to an embodiment of the disclosure disposed in two mobile robots is avoided.

In this case, the processor 60 of the distance measurement device 1 of the first mobile robot R1 may shift the timing of turning on the light source 10 by a predetermined time $\Delta T$ as illustrated in FIG. 19. In this case, the shift time $\Delta T$ may be smaller than the time interval T at which the light source 10 is turned on. Thus, the timing at which the distance measurement device 1 of the first mobile robot R1 emits light may not coincide with the timing at which the distance measurement device 1 of the second mobile robot R2 emits light. Accordingly, light interference between the distance measurement devices of the two mobile robots R1 and R2 may be avoided.

With a wide-angle high-resolution distance measurement device according to an embodiment of the disclosure as described above, when the far-field resolution is lowered by using a wide-angle lens to obtain a wide horizontal angle of view, a resolution correction lens may be used to improve the far-field resolution while maintaining the horizontal angle of view.

In addition, with the wide-angle high-resolution distance measurement device according to an embodiment of the disclosure, when a horizontal angle of view is narrow by using a narrow angle lens to obtain a narrow vertical angle of view, a horizontal angle of view may be increased to a wide angle while maintaining the vertical angle of view by using a resolution correction lens.

As described above, the wide-angle high-resolution distance measurement device according to an embodiment of the disclosure may increase a far-field resolution by changing an optical system without using a high-resolution image sensor, thereby reducing manufacturing cost.

In addition, the wide-angle high-resolution distance measurement device according to an embodiment of the disclosure may increase the far-field resolution by changing the optical system without increasing the distance between the light source and the camera, which causes an increase in the size of the distance measurement device. Therefore, miniaturization of a mobile robot or the like equipped with the distance measurement device may be achieved.

In the above, the disclosure has been described in an exemplary manner. The terms used herein are for illustrative purposes only and should not be construed in a limiting sense. Various modifications and variations of the disclosure may be made according to the above contents. Accordingly, unless otherwise states, the disclosure may be freely practiced within the scope of the claims.

The invention claimed is:

1. A wide-angle high-resolution distance measurement device comprising:
   a light source configured to irradiate structured light;
   a camera configured to form an image by capturing reflected light, which is the structured light irradiated from the light source and reflected from an obstacle; and
   a resolution correction lens disposed in front of the camera and configured to correct the reflected light reflected from the obstacle and incident on the camera, wherein resolution of the image formed by the camera becomes uniform regardless of distance,
wherein the resolution correction lens is formed to sequentially change resolution so that a central portion of the resolution correction lens has a high resolution and an outer peripheral portion of the resolution correction lens has a low resolution,
wherein the camera includes an image sensor formed in a rectangular flat plate,
wherein the light source is disposed so that light reflected from a distant obstacle is incident toward a first end of the rectangular flat plate of the image sensor, and light reflected from a nearby obstacle is incident toward a second end of the rectangular flat plate of the image sensor, and
wherein the resolution correction lens is disposed such that the central portion is adjacent to the first end of the rectangular flat plate of the image sensor and the outer peripheral portion is adjacent to the second end of the rectangular flat plate of the image sensor.

2. The wide-angle high-resolution distance measurement device as claimed in claim 1, wherein the resolution correction lens has a circular cross-section,
wherein the image sensor is disposed such that the first end of the rectangular flat plate of the image sensor is spaced a predetermined distance downward from a straight line passing through a center of the resolution correction lens, and both corners of the second end of the rectangular flat plate of the image sensor are in contact with an inner surface of the circular cross-section of the resolution correction lens.

3. The wide-angle high-resolution distance measurement device as claimed in claim 1, wherein the resolution correction lens has a circular cross-section, and
wherein the image sensor is disposed such that the first end of the rectangular flat plate of the image sensor is spaced a predetermined distance downward from a straight line passing through a center of the resolution correction lens, and the second end of the rectangular flat plate of the image sensor is in contact with an outer circumferential surface of the circular cross-section of the resolution correction lens.

4. The wide-angle high-resolution distance measurement device as claimed in claim 1, wherein the resolution correction lens include a wide-angle lens.

5. The wide-angle high-resolution distance measurement device as claimed in claim 1, wherein the resolution correction lens is formed to have a highest resolution at one end portion along an outer circumferential surface and a lowest resolution at another end portion facing the one end portion.

6. The wide-angle high-resolution distance measurement device as claimed in claim 5,
wherein the light source is disposed so that the light reflected from the distant obstacle is incident toward the first end of the rectangular flat plate of the image sensor through the one end portion of the resolution correction lens, and the light reflected from the nearby obstacle is incident toward the second end of the rectangular flat plate of the image sensor through the another end portion of the resolution correction lens, and
wherein the resolution correction lens is disposed such that a center of the resolution correction lens coincides with a center of the image sensor.

7. The wide-angle high-resolution distance measurement device as claimed in claim 1, wherein the light source includes a line laser.

8. The wide-angle high-resolution distance measurement device as claimed in claim 1, wherein the image sensor is configured to capture the reflected light to form an image, and a focus lens formed to focus the reflected light on the image sensor, and
wherein the resolution correction lens is integrally formed with the focus lens in front of the focus lens.

9. The wide-angle high-resolution distance measurement device as claimed in claim 1, wherein the resolution correction lens includes a first axis and a second axis perpendicular to the first axis, and
wherein the resolution correction lens is formed such that distortion in a direction of the second axis is greater than distortion in a direction of the first axis.

10. A wide-angle high-resolution distance measurement device comprising:
a light source configured to irradiate structured light;
a camera configured to form an image by capturing reflected light, which is the structured light irradiated from the light source and reflected from an obstacle; and
a resolution correction lens disposed in front of the camera and configured to correct the reflected light reflected from the obstacle and incident on the camera, wherein resolution of the image formed by the camera becomes uniform regardless of distance,
wherein the resolution correction lens includes a first axis and a second axis perpendicular to the first axis, and
wherein the resolution correction lens is formed such that distortion in a direction of the second axis is greater than distortion in a direction of the first axis,
wherein when the camera is wide-angle in a horizontal direction, the resolution correction lens is a half-cylinder lens, and
wherein the half-cylinder lens is disposed such that the first axis is parallel to the structured light irradiated from the light source.

11. A wide-angle high-resolution distance measurement device comprising:
a light source configured to irradiate structured light;
a camera configured to form an image by capturing reflected light, which is the structured light irradiated from the light source and reflected from an obstacle; and
a resolution correction lens disposed in front of the camera and configured to correct the reflected light reflected from the obstacle and incident on the camera, wherein resolution of the image formed by the camera becomes uniform regardless of distance,
wherein the resolution correction lens includes a first axis and a second axis perpendicular to the first axis,
wherein the resolution correction lens is formed such that distortion in a direction of the second axis is greater than distortion in a direction of the first axis,
wherein when the camera is narrow angle in a horizontal direction, the resolution correction lens is a double-concave cylinder lens, and
wherein the double-concave cylinder lens is disposed such that the second axis is parallel to the structured light irradiated from the light source.

12. The wide-angle high-resolution distance measurement device as claimed in claim 1, further comprising:
a processor configured to control the light source and the camera,
wherein the processor controls so that the light source turns on at predetermined time intervals to irradiate structured light and the camera captures an image.

13. The wide-angle high-resolution distance measurement device as claimed in claim 12, wherein when the camera captures an image while the light source is not turned on, the processor shifts a timing of turning on the light source by a predetermined time.

\* \* \* \* \*